United States Patent [19]

Gleinig et al.

[11] 4,343,936
[45] Aug. 10, 1982

[54] PROCESS FOR THE PREPARATION OF CATIONIC DYESTUFFS

[75] Inventors: Harald Gleinig, Odenthal; Bernd Berger-Lohr, Leverkusen; Kurt Breig, Cologne, all of Fed. Rep. of Germany

[73] Assignee: Bayer Aktiengesellschaft, Leverkusen, Fed. Rep. of Germany

[21] Appl. No.: 245,411

[22] Filed: Mar. 19, 1981

[30] Foreign Application Priority Data

Apr. 5, 1980 [DE] Fed. Rep. of Germany ....... 3013273

[51] Int. Cl.³ .......................................... C07D 209/40
[52] U.S. Cl. .................................... 542/417; 260/165
[58] Field of Search ........................................ 542/417

[56] References Cited

U.S. PATENT DOCUMENTS 3,973,903 8/1976 Clarke .................................. 542/417
4,281,112 7/1981 Lehment et al. .................... 542/417

FOREIGN PATENT DOCUMENTS 2825296 12/1979 Fed. Rep. of Germany.
2164645 3/1973 France.

OTHER PUBLICATIONS

Chemical Abstracts, Band 83, Nr. 4, 28, Jul. 1975, Pate 98, Nr. 29878s.

Primary Examiner—Arthur P. Demers
Attorney, Agent, or Firm—Sprung, Horn, Kramer & Woods

[57] ABSTRACT

Cationic dyestuffs of the general formula

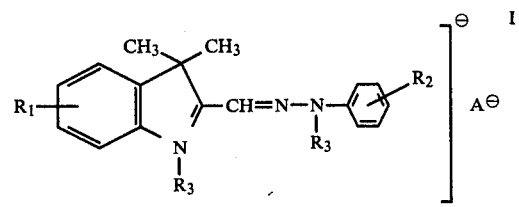

wherein
$R_1$ represents hydrogen, $C_1$–$C_4$-alkyl, $C_1$- to $C_4$-alkoxy, nitro or halogen,
$R_2$ represents hydrogen, $C_1$- to $C_4$-alkyl, $C_1$- to $C_4$-alkoxy, halogen or phenylazo,
$R_3$ represents $C_1$- to $C_3$-alkyl and
$A^\ominus$ represents an anion, are prepared by reacting azo bases of the general formula

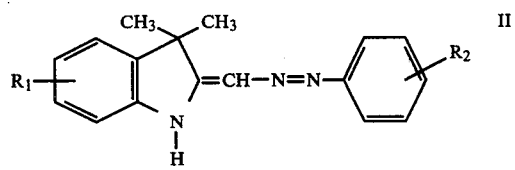

wherein $R_1$ and $R_2$ have the abovementioned meaning, or the salts thereof with inorganic or organic acids, with dialkyl sulphates of the general formula $$(R_3-O-)_2SO_2 \qquad \text{III}$$

wherein $R_3$ has the abovementioned meaning, in the absence of organic solvents and in the presence of water, the weight ratio of azo base to water being 100:20–300 and the molar ratio of azo base to dialkyl sulphate being 1:3.5–5.0, and, if desired, by replacing the alkyl-sulphate anion with another anion.

7 Claims, No Drawings

PROCESS FOR THE PREPARATION OF CATIONIC DYESTUFFS

The present invention relates to a process for the preparation of cationic dyestuffs of the general formula

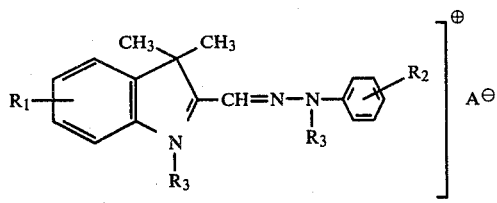

wherein
$R_1$ represents hydrogen, $C_1$–$C_4$-alkyl, $C_1$- to $C_4$-alkoxy, nitro or halogen,
$R_2$ represents hydrogen, $C_1$- to $C_4$-alkyl, $C_1$- to $C_4$-alkoxy, halogen or phenylazo,
$R_3$ represents $C_1$- to $C_3$-alkyl and
$A^\ominus$ represents an anion,
by reacting azo bases of the general formula

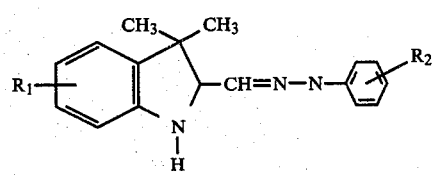

wherein $R_1$ and $R_2$ have the abovementioned meaning, or the salts thereof with inorganic or organic acids, with dialkyl sulphates of the general formula

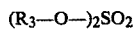     III wherein $R_3$ has the abovementioned meaning, in the absence of organic solvents and in the presence of water, the weight ratio of azo base to water being 100:20–300 and the molar ratio of azo base to dialkyl sulphate being 1:3.5–5.0, and, if desired, by replacing the alkyl-sulphate anion with another anion.

The process according to the invention makes it possible to alkylate dye bases of the general formula II rapidly and quantitatively and, in particular, to convert the weak dye bases of the general formula

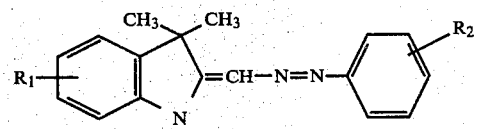

which are formed as intermediates and are difficult to quaternise, quantitatively to the dyestuffs I in a rapid reaction.

The process is as a rule carried out in a pH range of 6–10 using acid-binding agents, such as alkali metal oxides, hydroxides, carbonates or bicarbonates or alkaline earth metal oxides, hydroxides, carbonates or bicarbonates, at temperatures between 20° and 100° C. and requires only very short reaction times of about 30 minutes to about 2 to 3 hours.

An essential criterion for the process according to the invention is the azo base:water:dialkyl sulphate ratio, which in the indicated ranges results in a melt.

The preferred weight ratio of azo base:water is 100:50–150 and the preferred molar ratio of azo base:dialkyl sulphate is 1:3.5–4.5.

The indicated amounts of water include the water which may be formed during the reaction of the acid-binding agents.

In place of the dye bases of the formula II, it is also possible to use their salts with inorganic or organic acids, for example with hydrochloric acid, sulphuric acid, acetic acid or phosphoric acid. The salts which are obtained when the dye bases are prepared by diazotisation of corresponding aniline derivatives and coupling of the diazo compound with 2,3,3-trimethylindolenine derivatives are preferably used. The dye bases are liberated by adding acid-binding agents in the first reaction step.

A particularly suitable embodiment of the process comprises initially introducing the quaternising agent—optionally together with the corresponding amount of water and a portion of an acid-binding agent—and then introducing the azo base, in the dry form or in the form of a moist paste, with the remainder of the acid-binding agent, the quaternising agent for the dye base at the same time serving as the solvent.

Examples of quaternising agents which may be mentioned are dimethyl sulphate and diethyl sulphate, but especially dimethyl sulphate.

In the formulae, halogen is understood as meaning preferably chlorine or bromine.

Preferably:
$R_1$ represents hydrogen, methyl or methoxy,
$R_2$ represents hydrogen, methyl, ethyl, methoxy, ethoxy or phenylazo,
$R_3$ represents methyl or ethyl and
$A^\ominus$ represents methosulphate, ethosulphate, chloride, sulphate, phosphate or acetate or mixtures of these anions.

The process according to the invention is particularly suitable for the preparation of the dyestuffs of the formula I wherein
$R_1$ represents hydrogen,
$R_2$ represents hydrogen, methoxy, methyl or phenylazo,
$R_3$ represents methyl and
$A^\ominus$ represents the abovementioned anions,
and especially for the preparation of the dyestuff of the formula

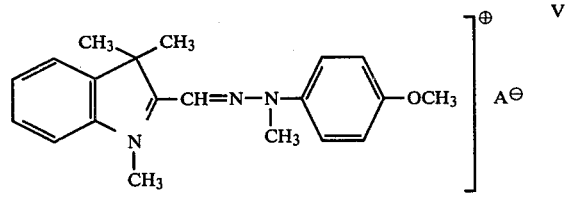

Compared with known aqueous quaternisation processes which operate with a relatively large weight ratio of water:azo base, for example the process disclosed in DE-OS (German Published Specification) No. 2,262,780, the advantage of the process according to the invention lies in the fact that considerably less quaternising agent is required for quantitative conversion.

Compared with anhydrous quaternisation processes, for example the process disclosed in DE-OS (German Published Specification) No. 2,825,296, considerably shorter reaction times are required in the case of the process according to the invention and, moreover, more complete conversions are achieved.

In detail, the preferred process can be carried out by, for example, initially introducing the dialkyl sulphate, the corresponding amount of water and a portion of the acid-binding agent and introducing a dye base of the general formula II, in the dry state or optionally in the form of a moist paste, together with the remainder of the acid-binding agent at 20°-50° C., preferably 20°-40° C., at a rate such that the pH value does not fall below 7 and is preferably 7-9.

The temperature is then raised to 65°-100° C. in order to effect quantitative conversion, and a virtually homogeneous melt forms.

The pH of the reaction mixture is then adjusted to 1-7, and preferably 3-6, with acid, for example hydrochloric acid, sulphuric acid, acetic acid or phosphoric acid, and the mixture is evaporated to dryness, for example in a vacuum paddle drier or spray drier.

The process provides valuable cationic hydrazone dyestuffs which have the fastness properties customary in the trade and have clear, brilliant colour shades. It has the advantage that no effluent is produced.

EXAMPLE 470 g of the dyestuff of the formula

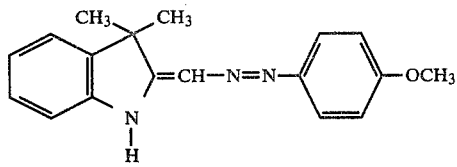

(in the form of the HCl salt) with a solids content of 70% are introduced in portions in the course of 1 hour, at 25°-30° C., into a mixture of 504 g of dimethyl sulphate, 100 g of water and 75 g of sodium carbonate. Simultaneously with the dyestuff, 145 g of sodium carbonate are introduced at a rate such that the pH value does not fall below 7 and is preferably 7-9.

The reaction mixture is then heated to 70°-80° C. in the course of about 15-20 minutes, and a homogeneous reaction melt forms. The reaction has ended when no traces or only slight traces of the methylate base formed as the intermediate can be detected by thin layer chromatography. If necessary, further small amounts of sodium carbonate and dimethyl sulphate are added. The pH of the reaction melt is then brought to 4-6 with hydrochloric acid and the mixture is evaporated to dryness in a vacuum paddle drier. About 925 g of dry hydrazone dyestuff of the formula V, with the corresponding content of reaction salts, result. The reaction product can be employed for dyeing without further purification.

Analogously to this example, the dye bases of the general formula II in which $R_1$ represents hydrogen and $R_2$ represents hydrogen, p-CH$_3$ or

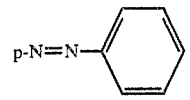

can also be converted to the corresponding cationic dyestuffs.

We claim:
1. Process for the preparation of cationic dyestuffs of the general formula

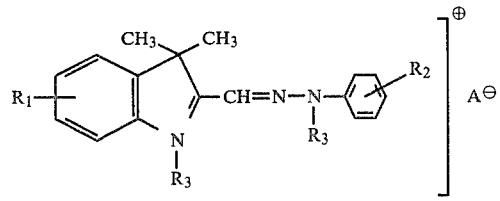

wherein
$R_1$ represents hydrogen, $C_1$- to $C_4$-alkyl, $C_1$- to $C_4$-alkoxy, nitro or halogen,
$R_2$ represents hydrogen, $C_1$- to $C_4$-alkyl, $C_1$- to $C_4$-alkoxy, halogen or phenylazo,
$R_3$ represents $C_1$- to $C_3$-alkyl and
$A^\ominus$ represents an anion,
by reacting azo bases of the general formula

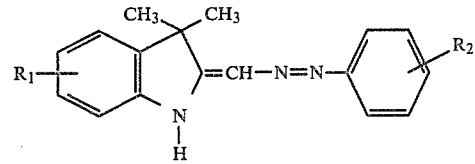

or salts thereof with inorganic or organic acids, with dialkyl sulphates of the general formula

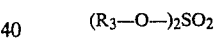

in the absence of organic solvents and in the presence of water and, if desired, by replacing the alkylsulphate anion with another anion, characterised in that the weight ratio of azo base to water is 100:20-300 and the molar ratio of azo base to dialkyl sulphate is 1:3.5-5.0.

2. Process according to claim 1, characterised in that the weight ratio of azo base to water is 100:50-150 and the molar ratio of azo base to dialkyl sulphate is 1:3.5-4.5.

3. Process according to claim 1, characterised in that the dialkyl sulphate, an acid-binding agent and water are initially introduced and the azo base and further acid-binding agent are added.

4. Process according to claim 3, characterised in that the azo base is added in the form of a moist paste.

5. Process according to claim 1, characterised in that the reaction is carried out at pH values of 6-10.

6. Process according to claim 1, characterised in that the reaction is carried out at 20°-100° C. for 30 minutes to about 2 to 3 hours.

7. Process for the preparation of cationic dyestuffs of the formula of claim 1, wherein
$R_1$ represents hydrogen, methyl or methoxy,
$R_2$ represents hydrogen, methyl, ethyl, methoxy, ethoxy or phenylazo,
$R_3$ represents methyl or ethyl and
$A^\ominus$ represents methosulphate, ethosulphate, chloride, sulphate, phosphate, or acetate or mixtures of these anions.

* * * * *